United States Patent [19]

De Bell et al.

[11] 3,879,756

[45] Apr. 22, 1975

[54] AUTOMATIC DRIVE STOP CONTROL UTILIZING MOTOR VOLTAGE TRANSIENTS

[75] Inventors: Lawrence R. De Bell, Bethany; David D. Price, Jr., Oklahoma City, both of Okla.

[73] Assignee: The Economy Company, Oklahoma City, Okla.

[22] Filed: Mar. 13, 1973

[21] Appl. No.: 340,706

[52] U.S. Cl. ...................... 360/74; 226/33; 226/43; 242/186; 242/191; 318/6

[51] Int. Cl. . G11b 15/18; B65h 25/00; B65h 59/38

[58] Field of Search ............ 179/100.2 S, 100.2 CA; 242/191, 186; 274/4 D, 11 D; 360/74; 318/6, 7, 364; 226/33, 43

[56] References Cited

UNITED STATES PATENTS

| | | | |
|---|---|---|---|
| 2,798,991 | 7/1957 | Winchester et al. | 318/6 |
| 2,847,513 | 8/1958 | Schlafly | 179/100.2 S |
| 3,429,491 | 2/1969 | Windley | 226/108 |
| 3,488,017 | 1/1970 | Schatteman | 242/191 |
| 3,602,517 | 8/1971 | Schnal | 179/100.2 CA |

*Primary Examiner*—Terrell W. Fears
*Assistant Examiner*—Robert S. Tupper

[57] ABSTRACT

Electrical apparatus for use in combination with record transducing apparatus of the type which moves a record medium past a fixed position for operative contact with a record or reproducing transducer, which electrical apparatus is comprised of audio reproducing circuitry as well as predetermined control tone reproducing circuits in coaction with tape drive logic and control circuitry; such tape drive control circuitry particularly including circuits for sensing tape drive condition to derive a signal indicative of proper tape movement which may be utilized to further control selected or numerous ones of operational tape drive functions as exercised through gate circuit control of the various transducing apparatus functions.

12 Claims, 6 Drawing Figures

AUTOMATIC DRIVE STOP CONTROL UTILIZING MOTOR VOLTAGE TRANSIENTS

CROSS-REFERENCE TO RELATED APPLICATIONS

The subject matter of the present invention is related to the inventions disclosed in U.S. Pat. application Ser. No. 239,944, filed on Mar. 3, 1972, now U.S. Pat. No. 3,780,231 and entitled "Improvements in Tape Transport Apparatus," and U.S. Pat. application Ser. No. 340,178, filed concurrently herewith, now U.S. Pat. No. 3,933,922, and entitled "Improvements in Record Transport Transducer Head Controls," both applications being in the name of the present inventors.

BACKGROUND OF THE INVENTION

1. Field of the Invention

The invention relates generally to record transport control and transducing circuits and, more particularly, but not by way of limitation, it relates to improvements in tape transport control circuitry which is continually responsive to tape condition.

2. Description of the Prior Art

There is no prior art known to the inventors which is directed to control circuitry of the type which is responsive to tape motion and condition to effect any of several automatic control functions. Operation of the control circuitry in response to tape condition is actually enabled by novel mechanical structure which includes separate drive motors for each transport function, motor driven transducer head engagement structure and pivotally engageable transducer control bar and associated switch control; thus, in view of the totality of change from existing circuit and construction practices, the present invention teachings are quite far removed from existing prior art known to the inventors.

SUMMARY OF THE INVENTION

The present invention contemplates improvements in operation and control circuits for record transport apparatus. In a more limited aspect, the invention consists of record transport apparatus of the type which utilizes cassette-type continuous tape, which includes circuits for sensing tape drive motion and variations therefrom to provide a control signal output to stop the tape drive system when any of several conditions are sensed, e.g. end of tape, failure of tape take-up, tape snagging around pinch roller, or any condition where the take-up motor ceases to turn. Additional circuit logic and control stages serve to provide interactive function between the automatically responsive circuitry and the normal operation control stages for the play, rewind, etc. conditions which are operable by front panel switch actuation.

Therefore, it is an object of the present invention to provide tape transport apparatus which is automatically responsive to variations from normal tape drive function.

It is also an object of the invention to provide tape transport control circuitry which is responsive to predetermined conditions of the forward tape drive motor to de-energize the tape drive system.

It is yet another object of the present invention to provide control circuitry for coaction with cassette-type transports which includes separate drive motors and motor-controlled transducer positioning mechanism in order to provide a plurality of automatic tape control functions.

It is still another object of the present invention to provide improved tape transport drive and control circuitry which has increased reliability, speed variation control, and constant speed capability.

Finally, it is an object of the present invention to provide an improved cassette-type tape transport which is particularly useful in audio teaching machine applications due to the enablement of numerous automatic control functions.

Other objects and advantages of the invention will be evident from the following detailed description when read in conjunction with the accompanying drawings which illustrate the invention.

BRIEF DESCRIPTION OF THE DRAWINGS

FIG. 6 is a schematic diagram of the control circuitry of the present invention.

DETAILED DESCRIPTION OF THE INVENTION

Figure 1:
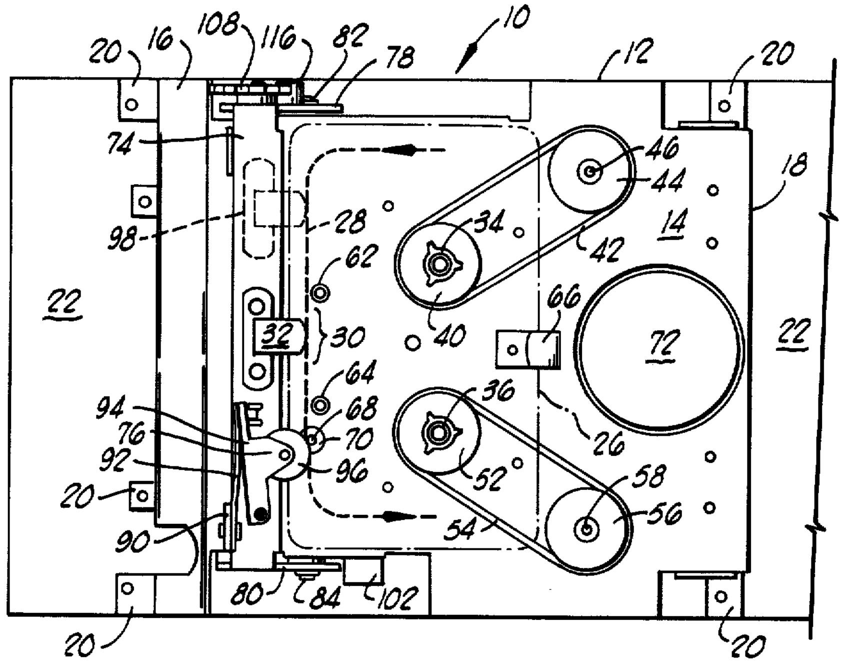
FIG. 1 is a top plan view of a tape transport constructed in accordance with the present invention.
Figure 2:
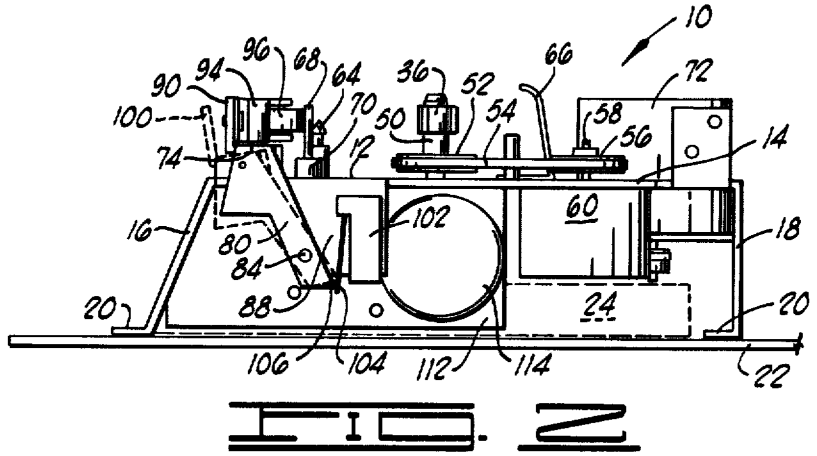
FIG. 2 is a side elevation of one side of the tape transport of FIG. 1.
Figure 3:
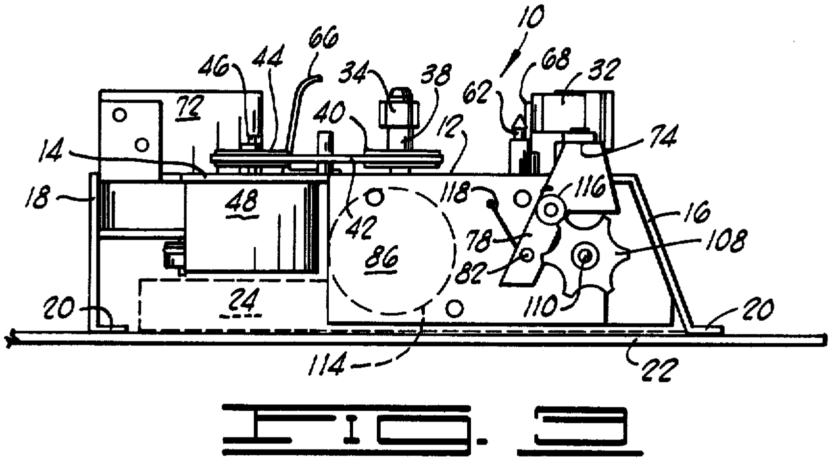
FIG. 3 is a side elevation of the opposite side of the tape transport of FIG. 1.

Referring to FIG. 1, a tape transport 10 consists of a support structure or chassis 12 which is formed as a planar top surface 14, a slanted front surface 16 and a rear surface 18 (see also FIGS. 2 and 3). Plural attaching flanges 20 are then directly connectable to a circuit board base 22. The circuit board base 22 provides multiple function as a printed circuit board for associated electronic components (see dash-line area 24), as a base panel unit, and it includes integral contact circuitry for integral coaction with front panel switch elements, such printed circuit structure being fully described in the co-pending U.S. application Ser. No. 239,944.

Tape transport 10 is adapted to receive a standard form of magnetic tape cassette as shown by dash-line 26 in FIG. 1. The cassette 26 includes conventional internal reel and pulley structure whereby continuous magnetic tape 28 may be continually moved past a fixed position, indicated generally by bracket 30, whereat contact is made with a transducer head 32. Rotary drive to cassette 26 is supplied by independently driven tape drive spurs 34 and 36 which fit into engagement with the respective drive sprockets of tape cassette 26. The tape supply drive spur 34 is supported on a shaft 38 (see FIG. 3) extending axially upward from a drive pulley 40. The drive pulley 40 receives rotation from a drive belt 42 which, in turn, is moved by a drive pulley 44 secured to an output shaft 46 of a supply drive motor 48 as secured to the underside of chassis top surface 14.

Similar structure is employed for the take-up function (see FIG. 2) as take-up drive spur 36 is secured on shaft 50 and drive pulley 52 to receive rotary motion via drive belt 54 from an output drive pulley 56. The output drive pulley 56 is secured to motor shaft 58 of a take-up motor 60. Supply motor 48 and take-up motor 60 are presently designated as commercially available D-C motors, Type No. MHN-5LB3, as manufactured by Matsushita Industrial Electric Company, Ltd. of Tokyo, Japan.

The cassette 26 is received in operative placement with the aid of standard-spaced guide pins 62 and 64 as suitably secured on top surface 14, and a spring clip 66 provides captive retention of the rear edge of cassette 26. A drive capstan 68 is rotatably retained in a bushing 70 secured through chassis top surface 14; and, therebelow, the lower shaft end of capstan 68 is secured through mechanical linkage to receive rotational drive from a capstan drive motor 72. The capstan drive linkage is pulley-belt transmission, and the precise structure is more particularly set forth in the aforementioned related U.S. Pat. application, Ser. No. 239,944. As the invention is presently constructed, capstan drive motor 72 is a type MHI-5L6C, commercially available from Matsushita Industrial Electric Company, Ltd.

A control bar 74 carries the transducer head 32 and a capstan idler 76, and serves the function of controllably moving associated componenets into and out of operative position relative to tape cassette 26 and fixed position 30. The control bar 74 is formed to include right-angle extending pivot arms 78 and 80 from opposite ends thereof, pivot arms 78 and 80 then each being pivotally affixed at pivot posts 82 and 84 as secured to respective flange brackets 86 and 88.

A flange 90 formed vertically from control bar 74 has one end of a flat spring 92 secured thereto with the opposite end of spring 92 urging against a pivotally secured pulley yoke 94 carrying capstan idler pulley 96 in position to urge idler pulley 96 against drive capstan 68 when in operative position. The transducer head 32 is suitably affixed directly on top of control bar 72 as by screw fasteners or the like, and modifications of the transport may include additional heads such as a recording transducer head, as shown by dash-lines 98.

FIGS. 1, 2 and 3 each show control bar 74 in the engaged or operative position; however, the opposite or disengaged control bar position is shown by dash-lines 100 in FIG. 2. An engage sense microswitch 102 is secured on flange bracket 88 to extend a feeler contact 104 in actuating position relative to an actuating corner 106 of pivot arm 80. The engage sense switch 102 is connected normal open (N.O.) when control bar 74 is disengaged, and will conduct normal closed (N.C.) when control bar 74 is in the operative position with feeler contact 104 relaxed. The engage sense switch 102 and associated circuits will be further described below.

Pivotal actuation of control bar 74 is effected by means of a star wheel 108 as driven by a rotary output shaft 110 from a gear train linkage (not specifically shown) within a housing 112 and receiving rotational input from a head engage motor 114. A specific form of gear train linkage is disclosed in the co-pending Patent Application filed concurrently herewith; however, it is submitted that any of conventional rotational reduction mechanisms may be utilized so long as a desired reduction ratio is achieved.

A cam followed 116, a roller or post, is secured on pivot arm 78 in coactive position with star wheel 108 such that movement of the star wheel and positioning of cam roller 116 at the outer star wheel diameter will place control bar 74 in the engage position, while movement of cam roller 116 down into the lands or inner diameter of star wheel 108 will allow the control bar 74 to move to the disengage position. A wire spring 118 is secured to lead down beneath pivot post 82 and upward into hook engagement over the edge of pivot arm 78, and serves to urge control bar 74 toward the disengage position as permitted by star wheel 108.

As transport 10 is presently constructed, the engage motor 114 is a commercially available motor of type MHN-5LB3 as manufactured by Matsushita Industrial Electric Company, Ltd.; however, generally satisfactory operation has been accomplished utilizing a commercially available motor/speed reducer combination such as the type MSG-F15, which is manufactured by Meguro Seiki Company, Limited, of Tokyo, Japan.

Figure 4:
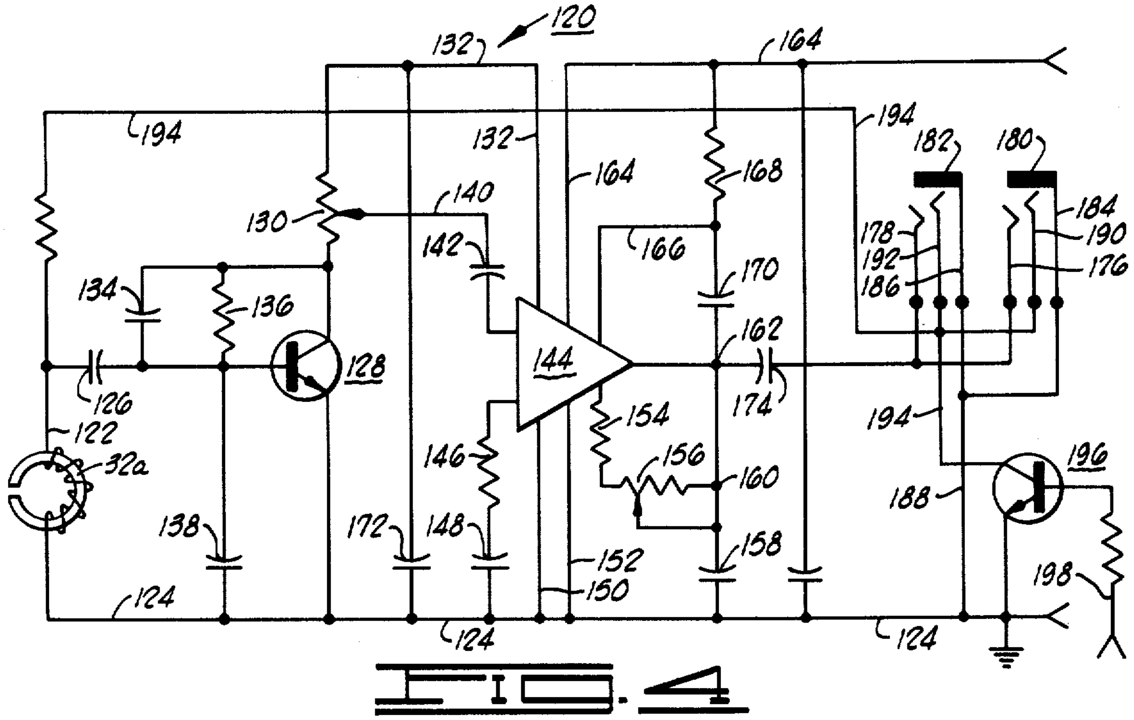
FIG. 4 is a schematic diagram of the audio circuitry of the present invention.

Referring now to the electronic circuit of the invention, FIG. 4 is a schematic diagram of the audio circuitry 120. An audio transducer 32*a* provides pick-up of audio indication from the cassette tape 28 (FIG. 1) to provide a counterpart electrical signal between input lead 122 and a ground lead 124. The transducer head 32*a* may be one-half of a standard form of four track, two-channel stereo transducer, with the remaining half being utilized in the tone circuitry (FIG. 5), as will be further described below.

The audio signal present on lead 122 is conducted via a coupling capacitor 126 for input to the base of an NPN transistor 128. Transistor 128 is connected common-emitter with the emitter connected to ground 124 and the collector connected through a load resistance, a volume control potentiometer 130, to a power supply lead 132 having source as will be further described below. An equilization network consisting of a capacitor 134 and parallel-connected resistor 136 are connected between collector and base of transistor 128, and the base is further decoupled through connection of a capacitor 138 to ground 124.

An amplitude controlled signal is conducted from potentiometer 130 via a lead 140 and coupling capacitor 142 for input to an integrated circuit audio amplifier 144. The audio amplifier 144 is a commercially available type TAA-300 as manufactured by Amperex Electronics Corporation of Slatersville, Rhode Island. Standardized biasing techniques are carried out through utilization of a resistor 146 and series-connected capacitor 148 to ground, connectors 150 and 152 to ground, and an idle current adjustment network consisting of series-connected resistors 154 and potentiometer 156 as connected through a capacitor 158 to ground. The junction point 160, between potentiometer 156 and capacitor 158, is also connected to an output junction point 162 from audio amplifier 144, and potentiometer 156 serves to adjust the circuit idle current for the purpose of maintaining minimum waste power. Positive voltage is applied to audio amplifier 144 from a positive voltage supply lead 164, and supply of further reduced potential for application on a lead 166 is derived from a junction between series-connected resistor 168 and capacitor 170 connected between the positive supply lead 164 and audio amplifier output junction point 162.

The lead 132 from audio amplifier 144 provides a positive supply of slightly reduced voltage for energization of the input transistor 128. This manner of energization provides an appreciable amount of isolation as between input and output of audio amplifier 144, and further smoothing of any transient variations in power supply is effected by a capacitor 172 connected between supply lead 132 and ground 124.

The amplified audio signal at junction point 162 is then conducted through an output capacitor 174 to an output speaker device or system. In this particular case, the output from capacitor 174 is shown as being applied to the speaker contacts 176 and 178 of respective two-way jacks 180 and 182. This particular form of output receptacle is particularly adaptable for usage of the present invention in teaching machine applications. Use of the two-way jacks 180 and 182 enables the user or users to talk to themselves or repeat certain audio data to themselves during a tutoring session.

The contacts 184 and 186 are connected through a lead 188 to ground 124, and contacts 190 and 192 provide connection with the microphone contacts of the associated user head set. The microphone contacts 190 and 192 are then connected to a lead 194 which is applied back to the input of transistor 128. Lead 194 is also connected to the collector of a common-emitter connected NPN transistor 196 which functions as a microphone mute stage when the record transport is in the reproduce or playback operating mode. When the apparatus is in playback mode, a positive voltage is present on input lead 198, which voltage effectively shorts collector lead 194 to ground 124 thereby to disable microphone input from jacks 180 or 182.

Figure 5:
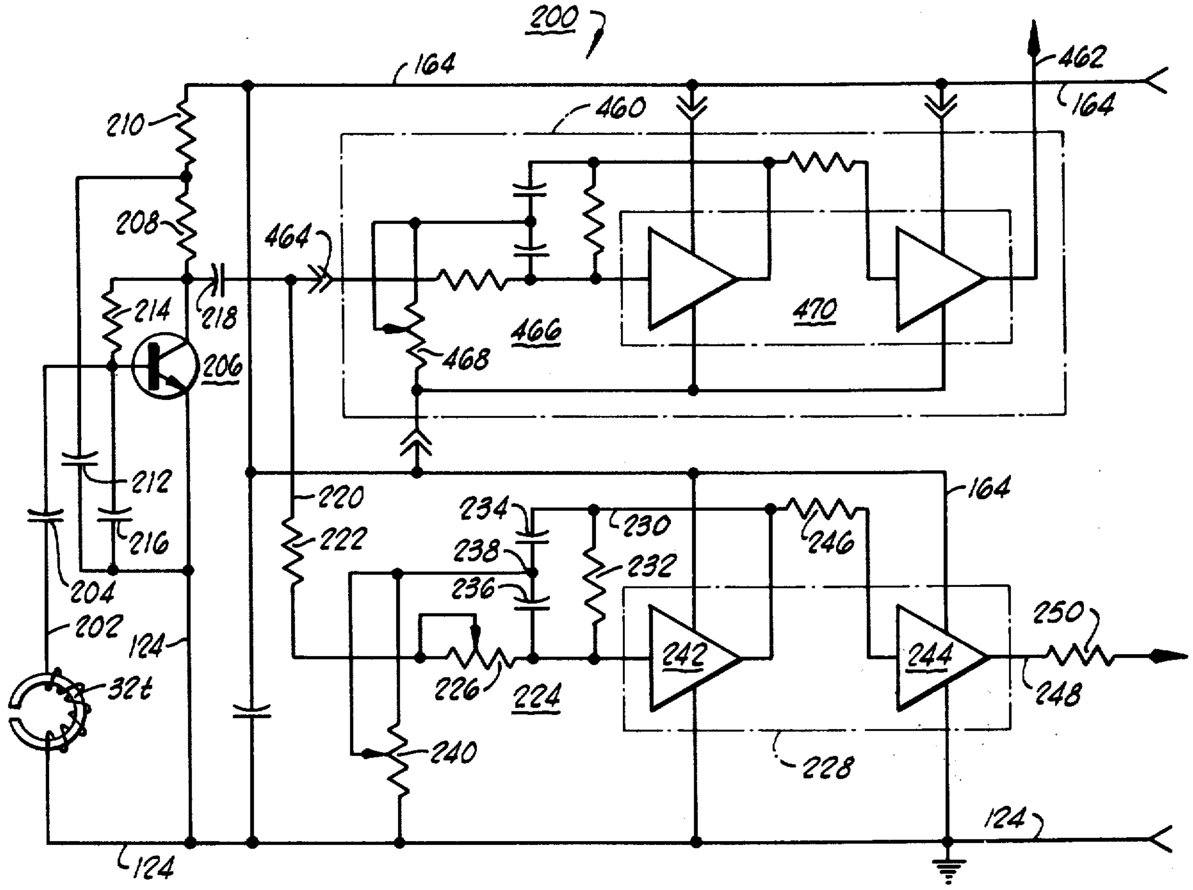
FIG. 5 is a schematic diagram of the control tone circuitry of the present invention.
Figure 5:
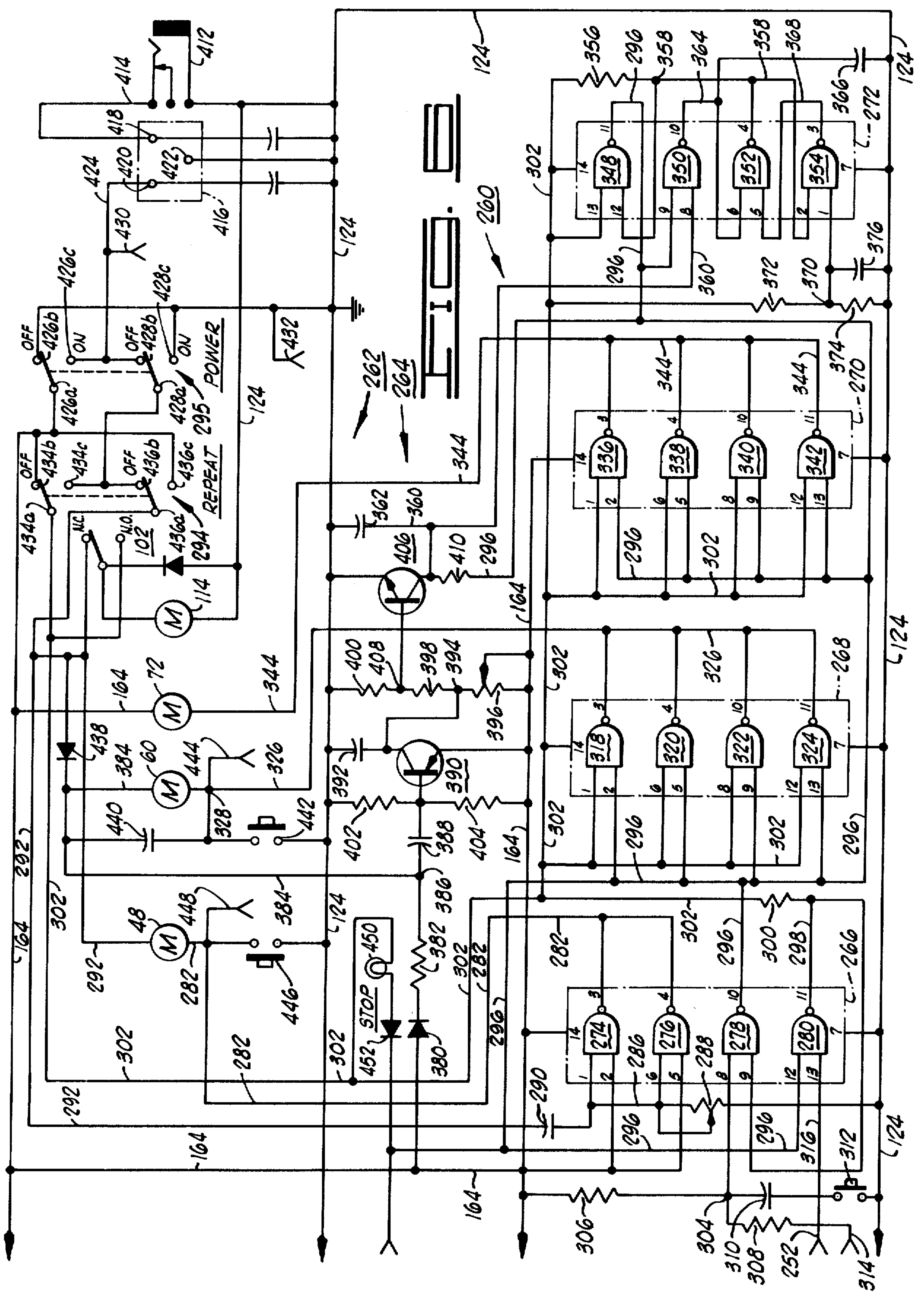

FIG. 5 is a schematic diagram of the control tone circuitry 200 as may be utilized with the present invention. The control tone circuitry is particularly useful for teaching machine applications wherein control tones are utilized for speed control, stopping tape for answer interval, auxiliary equipment energization, etc. A primary teaching machine application utilizes a control tone for stopping the tape forward drive after audio output of an instruction or question to allow time for a student user to perform a next requisite function such as answering, repeat, or denoting of other auxiliary indication.

The control tone, e.g. a sine wave of specified frequency, may be recorded on the record tape in a separate channel, or it may be recorded in superimposition to other audio trck signals for extraction through filtered removal. A control tone head **32*t* which may be an integral portion of transducer head 32 as previously described, transduces control tone signal from the moving tape and develops the signal between ground 124 and input lead 202. Signal on input lead 202 is applied through a coupling capacitor 204 for input to the base of a common-emitter connected NPN transistor 206. The control tone input transistor 206 is connected essentially in the same manner as the audio signal input transistor 128**, previously described.

The amplifier transistor 206 has the emitter connected directly to ground with the collector connected through series-conneceed load resistors 208 and 210 to the positive supply lead 164. Power supply voltage filtering is effected by means of grounded capacitor 212, while de-coupling is effected by the collector/base resistor 214 and base/ground capacitor 216. Output is taken from the collector of transistor 206 via coupling capacitor 218 for input on lead 220 and resistor 222 to a resistance-capacitance filtering network 224.

The filtering network 224 consists of a series potentiometer 226, a sensitivity tuning resistance, as directly connected for input to an integrated circuit audio amplifier 228. Filtering is also effected through lead 230 supplying regenerative feedback to the series/parallel connected resistor 232 and capacitors 234 and 236 connected in series to the input of audio amplifier 228. A terminal junction 238 between series-connected capacitors 234 and 236 is connected through a potentiometer 240 to ground, potentiometer 240 being a frequency tuning control. In present designs, the control tone frequency is designated to be 1,500 Hertz; however, some equivalent transport designs utilize a control tone frequency of 60 Hertz, and the actual designated frequency is susceptible of wide variation.

The integrated circuit audio amplifier 228 is a Motorola Type MC1306P and provides two stage audio amplification by means of amplifiers 242 and 244. Energizing power is applied to amplifiers 242 and 244 from the positive supply lead 164 and return connection is provided from ground 124. Amplifier interconnection is effected externally by means of series resistor 246. The amplified control tone signal from output audio amplifier 244 is then present on a lead 28 through current limiting resistor 250 and is present at connection 252 (FIG. 6) for application to logic components of the control circuitry.

Referring now to FIG. 6, the control circuitry of the invention consists of control logic circuitry 260 as connected for operative interaction with control actuation circuitry 262. A tape motion sense circuit 264 provides control function in association with control logic circuitry 260, as will be further described in detail.

The control logic circuitry 260 is essentially comprised of four integrated circuit NAND Gate modules 266, 268, 270 and 272. Each of the NAND Gate modules 266–272 may be such as the Motorola Type MC858P- "Quad—Two Input NAND Power Gate," a type which has open collector outputs for power applications such as motor control. Each of the individual NAND gates function so that there will be an output signal or voltage present in all conditions except when signal input is present at both gate inputs.

The module 266 consists of four NAND gates 274, 276, 278 and 280; gates 274 and 276 serve a timed rewind latching function with parallel output on a lead 282 for connection to one side of the rewind or supply motor 48. Input pins 1 and 6 to gates 274 and 276 are supplied via lead 286 which is connected through a "rewind time adjustment" potentiometer 288 to ground 124, as well as through a capacitor 290 to a control lead 292 leading to the REPEAT switch 294 in control circuitry 262. Remaining inputs to pins 2 and 5 of gates 274 and 276 is from the positive supply lead 164, which leads back for connection to the POWER switch 295.

Remaining gates 278 and 280 of module 266 function as a flip-flop to perform bi-stable latching as the output from gate 278 is connected to a control lead 296 which is interconnected to perform extensive logic switching, as will be further described. The output lead 298 from gate 280 is connected for latching input to pin 9 of gate 278 as well as through an isolation resistor 300 to a lead 302 which is also connected to the REPEAT switch 294. Remaining input to pin 8 of gate 278 is connected to a junction point 304 of a voltage divider consisting of a resistor 306 connected to positive supply lead 164 and the parallel-connected resistor 308 and capacitor 310 as connected to one terminal of a RESTART switch 312 (normally open), the remaining terminal being connected to ground 124. A terminal connector 314 is included for purposes of remote operation, a function which is particularly valuable when the invention is utilized in teaching machine applications.

The input at pin 12 to gate 280 is connected to control lead 296, i.e., the output from gate 278, and the remaining input on lead 316 receives input on interconnection 252 from resistor 250 and output lead 248 of control tonee audio amplifier 244 (FIG. 5). When there is no control tone being reproduced, output from audio amplifier 244 will be one half the supply positive voltage at input lead 316, as will be further described below.

The NAND gate module 268 functions as the forward motor stop control circuit and includes four NAND gates 318, 320, 322 and 324 as connected in parallel to provide energization control via output lead 326 to a junction point 328 and the forward or take-up drive motor 60. Gate input is applied from lead 302 for input to pins 1, 6, 8 and 12, respective first gate inputs of gates 318–324, and lead 302 also supplies positive voltage input at pin 14 to module 268. The remaining gate inputs at pins 2, 5, 9 and 13 are applied from the control lead 296 as enabled from gate 278 of module 266.

The NAND gate module 270 includes NAND gates 336, 338, 340 and 342 functioning in parallel to provide output to a lead 344 as connected to the capstan drive motor 72. Positive supply voltage to pin 14 of module 270 is applied directly from positive supply lead 164, and respective gate inputs at pins 1, 6, 8 and 12 receive input from lead 302. The remaining second gate inputs to pins 2, 5, 9 and 13 receive input from the logic control lead 296.

NAND gate module 272 serves the function of latching the tape motion stop actuation, and it consists of NAND gates 348, 350, 352 and 354, the NAND gates 352 and 354 operating as a flip-flop stage to perform bi-stable latching. Lead 302 is connected to supply positive voltage input to pin 14 of module 272, and lead 302 is also connected through a resistor 356 to junction point 358 whereupon it is connected as gate input at pin 12 of NAND gate 348, to gate input pin 2 of NAND gate 354, and to the gate output pin 4 of NAND gate 352. Lead 302 is also connected to gate input pin 13 of NAND gate 348 which has the gate output pin 11 connected to control lead 296. Gate 350 has gate input pin 9 connected to control lead 296 while the second gate input pin 8 is connected to a lead 360 which is directly connected to the output of tape motion sense circuit 264, as will be further described below.

A capacitor 362 is connected between lead 360 and ground 124 to provide pre-set time delay which enables a momentary hold condition to gate input pin 8 of NAND gate 350, as will be further described below. Output from gate 350 pin 10 on a lead 364 conducts to the gate input pin 6 of gate 352, as well as through a capacitor 366 to ground 124; and the remaining or gate input at pin 5 to NAND gate 352 is applied via lead 368 from the output pin 3 of NAND gate 354. Inputs to NAND gate 354 consist of pin 2 input on lead 358 and a second gate input on pin 1 from a voltage divider junction 370. The junction 370 is formed by the series-connected resistors 372 and 374 connected between lead 302 and ground 124. A capacitor 376 is connected to ground in parallel with resistor 374 in order to provide brief actuation delay during start-up function.

The tape motion sense circuit 264 responds to a signal derived from take-up (forward) motor 60 to provide an output actuation for logical control of NAND gate 278 and control lead 296. Thus, in the running condition, take-up motor 60 is energized by positive voltage supply from lead 164 through diode 380 and resistor 382 to a lead 384 which is connected to the remaining energization terminal of take-up motor 60. The resistor 382 is presently designed to have the value of 18 ohms (1 watt) whereby it is able to provide a stalling condition to the take-up motor 60 to provide optimum tape windup. The take-up motor energization voltge is sensed at a terminal 386 by means of relatively large value coupling capacitor 388 to derive a signal indication of transients present on the motor supply when energized. The particular motor employed, the type MHN-5LB3, causes a negative-going, periodic voltage spike as a result of internal brush movement across the gap between armature segments. The motor 60 of present design produces three such negative-going pulses per revolution.

The negative pulses are conducted through coupling capacitor 388 for input to the base of a PNP transistor 390 which is connected common emitter with the collector connected through a capacitor 392 to ground as well as to a junction point 394 in a voltage divider circuit consisting of potentiometer 396, resistor 398 and resistor 400. The base of transistor 390 is biased by a grounded resistor 402 and resistor 404 connected to the positive supply lead 164. The combined effect of capacitor 388 and resistor 404 is one of integration of the input signal to provide a continuous signal conversion of repetition rate to voltage amplitude as applied to the base of transistor 390.

The base of an NPN transistor 406 is connected to junction point 408 of the voltage divider, and is connected common emitter with the collector connected through a resistor 410 to logic control lead 296 as well as to lead 360 for input to NAND gate 350. The potentiometer 396 provides a sensitivity adjustment for setting the voltage level at which transistor 406 will conduct and effectively place lead 360 at ground potential, as will be further described below in detail.

Referring particularly to control circuitry 262, input from a power source is included through a suitable connector, here shown as a jack 412, as applied between ground 124 and a lead 414 to a voltage regulator 416. Voltage regulator 416 includes an input terminal 418, output terminal 420 and ground terminal 422 and, in present designs, this component is a six volt regulator Type UGH7806393 which is commercially available from Fairchild Semiconductors, Inc.

Regulated 6 volt potential is then available via lead 424 from output terminal 420 to a double pole/double throw switch combination, POWER switch 295, shown schematically as switches 426 and 428 (respective contacts being letter designated). Thus, positive supply voltage is applied to contacts 426*c* and 428*b* while contacts 426*b* and 428*c* are connected directly to ground 124. Input terminal connectors 430 and 432 provide energizing connections for external or remote power connection. Further connection from common terminals 426*a* and 428*a* proceeds through the REPEAT switch 294, another double pole/double throw switch represented as by terminal contacts 434*a*, *b* and *c* and 436*a*, *b* and *c*.

The primary positive supply lead 164 is connected directly to the POWER switch common terminal 426*a* as well as to REPEAT switch contacts 434*b* and 436*c*, and POWER switch common terminal 428*a* is connected to remaining REPEAT switch contacts 434*c* and 436*b*. The REPEAT switch common contact 434*a* is connected directly to lead 302 as well as to the normal closed (N.C.) contact of engage sense switch 102. The REPEAT switch common terminal 436*a* is connected to lead 292 which is connected in parallel to supply motor 48 as well as to the normal open (N.O.) contact of engage sense switch 102. Lead 292 is further connected through a diode 438 to the forward drive energizing lead 384.

A capacitor 440 is connected in parallel with take-up motor 60 and provides the function of preventing motor 60 from running away when not under mechanical load. A pushbutton switch 442 connected between junction point 328 and ground 124 provides FAST FORWARD actuation and a terminal connector 444 provides external connection for remote operation. A pushbutton switch 446 connected between lead 282 and ground 124 provides REWIND actuation with provision for remote operation at terminal connector 448. A front panel STOP indicator lamp 450 is connected for energization between lead 302 and a series-connected rectifier 452 to control lead 296.

Referring again to FIG. 5, optional control tone circuitry, as shown within dash-line 460, may be included if exigencies of the particular transport application should require. Thus, the circuit 460 is another audio amplifier circuit which is similar to the previously described R/C tuning network 224 and audio amplifier 228. Circuit 460 is tuned for a different frequency, e.g. 200 cycles, for the purpose of providing an output signal via lead 462 for actuation of auxiliary equipment, viz. associated visual equipment, tutoring tally equipment, etc. Input to circuit 460 is provided through terminal connector 464 from the output of amplifier transistor 206 for application to a resistance/capacitance tuning network 466. A potentiometer 468 provides tuning control for pre-setting the tone detection frequency at a selected value. Output from the network 466 is then applied through successive stages of amplification in an audio amplifier 470 for output via lead 462 to associated equipment.

OPERATION

With first application of power by placing POWER switch 295 in the ON Position, positive voltage is then placed on each of leads 164 and 302, and stop indicator lamp 450 is energized due to the fact that control lead 296 will be at ground potential. This is caused by circuit transients from audio amplifier 228 via lead 316 applying momentary negative excursions to the normally positive input pin 13 of gate 280. Such excursions force output pin 11 of Gate 280 to go positive, also causing input pin 9 of gate 278 to go positive through direct connection. Since the other input pin 8 of Gate 278 is already positive through resistor 306, the output pin 10 of Gate 278 becomes latched negative through flip-flop action with Gate 280.

Energization of lead 302 to the R/C network consisting of resistor 372 and capacitor 376, places a delayed positive voltage level on gate 354 pin 1, thereby reversing gate output pin 3 to a positive level which is applied to input pin 5 of gate 352. Since input pins 8 and 9 to gate 350 are initially at ground, output pin 10 is positive and applies a positive input at gate 352 pin 6 such that gate 352 pin 4 output is at ground potential as applied from junction point 358 to gate 348 input pin 12. With gate 348 pin 13 positive and pin 12 at ground potential, the output gate at pin 11, connected to control lead 296, will be positive (or "open," since it is an open collector device) throughout the various interconnections. When gate 352 pin 4 assumes ground potential, a latching connection via lead 358 to gate 354 pin 2 maintains latching of the flip-flop combination of gates 352 and 354. This also serves to maintain ground at gate 348 pin 12 with control lead 296 energized.

To start play operation, depression of RESTART switch 312 energizes the time delay network consisting of capacitor 310 and resistors 306 and 308 to place a momentary ground at gate 278 pin 8 with gate output pin 10 or control lead 296 thus assuming a positive voltage level, and while be maintained at that level since input pin 8, after time delay, will have regained a positive level and gate 278 input pin 9 will be at ground or a lower voltage level since it is connected to pin 11 of gate 280 which assumed ground potential when the input pin 12 followed positive level of pin 10 of gate 278.

Further time delay upon starting is also necessitated by the tape motion sense circuit 264. Thus, at the first instant of starting of forward take-up motor 60, negative pulses sensed through capacitor 388 and amplified through PNP transistor 390 will be below the required threshold level for proper operation and could deactivate the tape motion stop latch or NAND gate module 272 except for the fact that initial conduction of transistor 406 to charge capacitor 362 through a predetermined time constant maintains input pin 8 to gate 350 at or near ground potential for a short time until NPN transistor 406 achieves its quiescent conductive state wherein lead 360 is maintained at ground potential, that condition when a sufficient number of negative pulses are being sensed and input to transistor 390.

In the running or play condition, gate 278 output on control lead 296 is positive and is applied in parallel to each input gate of NAND gates within the forward motor stop control module 268 and the capstan motor stop control module 270. Remaining inputs are also positive such that output leads 326 and 344 are at ground potential and takeup motor 60 and capstan motor 72 are energized. Takeup motor 60 is energized by positive supply lead 164 through diode 380 and a stalling resistor 383 for conduction via lead 384 through takeup motor 60 to the grounded output lead 326 from NAND gate module 368. In like manner, the capstan motor 72 is energized from positive supply lead 164 through lead 164 and grounded lead 344 from the outputs of NAND gate module 270.

Prior to actuation of POWER switch 295, the control bar 74 was in the non-play position as shown by dash-lines 100 of FIG. 2, and power applied from lead 424, through switch common contact 426*a* in the OFF position of REPEAT switch 294 and lead 302, was available on lead 302 at the normal open (N.O.) position of ENGAGE/DISENGAGE switch 102 for energization of tape head drive motor 114 and return to ground 124. Energization of motor 114 then effects rotation of star wheel 108 (see FIG. 3) until control bar cam roller 116 is caused to ride out on the outer periphery of star wheel 108 and control bar 74 is moved into its upright or play position. Also, upon assuming the play position, it may be noted from FIG. 2 that engage sense switch 012 is released, and that the switch contacts move to the normal closed (N.C.) position as shown in FIG. 6.

While tape transport 10 functions during a play operation, the tape motion sense circuit 264 provides continual control in response to any variations from normal tape operation. Thus, tape motion sense circuit 264 will activate at any of the end of tape, the failure of take-up motor 60 and/or the assembly driving sprocket 36 (FIG. 1), snapping or wind-up of the tape at the drive capstan 68, or any condition where the take-up motor 60 ceases to turn. The control logic imposes one exception, and that is where the tape movement is to be stopped in response to a stop tone input to control logic circuitry 260.

The sensivity of the tape motion sense circuit 264 is set by adjustment of potentiometer 396 which sets the response or bias voltage level for the base input to transistor 406. Negative going periodic pulses from take-up drive motor 60 are integrated through a capacitor 388 and resistor 404 to the base of transistor 390, and an insufficient number of such vertical going pulses, as when take-up motor 60 slows or stops, decreases conduction in transistor 390 which, in turn, will cutoff normally conducting transistor 406 driving lead 360 more positive as applied to pin 8 of gate 350. Since both pins 8 and pin 9 on gate 350 are positive, the output pin 10 drops to ground potential and applies ground level input at pin 6 gate 352 driving output pin 4 positive as applied at each of pin 12 gate 348 and pin 2 gate 354. Since gate 354 has positive voltage on pin 1, a negative output from pin 3 for input to pin 5 gate 352 provides a hold of positive output on pin 4, and with pins 13 and 12 both positive for input to gate 348, the output pin 11 to control lead 296 is held at ground potential. Grounding of control lead 296 is applied in parallel to each of NAND gates 336, 338, 340 and 342 to maintain respective outputs positive and turn off capstan motor 72. Similarly, the ground potential from control lead 296 is applied in parallel to each of NAND gates 318, 320, 322 and 324 to drive their respective outputs positive thereby to cease energization of takeup motor 60.

The tape transport cannot be made operative again until actuation of POWER switch 295 which serves to reset the start condition throughout the control circuit of FIG. 6. Momentary movement of the POWER switch 295 to the OFF position grounds the positive supply lead 164 and lead 302 through switch contact **426*b*** its associated ground connection; thereafter, after correction of whatever the difficulty dictating the stop condition, the tape transport is ready for re-actuation through logic sequence to the next play activation.

The REPEAT switch 294 enables a function which is particularly desirable when the invention is utilized in teaching machine applications. A student is able to actuate, REPEAT switch 294 to effect replay of a specifically timed portion of the record or amount of tape. This is a valuable function in auto-tutoring, and the amount of tape repeated on each actuation may be adjusted by setting of potentiometer 288, the rewind time adjustment, which functions in coaction with capacitor 290 to provide time delay actuation at pin 6 input to NAND gate 276, as will be further described below.

REPEAT is effected with POWER switch 295 in the ON position and REPEAT switch 294 actuated to place positive voltage supply on lead 292 supplying both rewind motor 48 and time delay capacitor 290. Discharging of capacitor 290 through potentiometer 288 will then maintain a positive voltage level on pins 1 of gate 274 and pin 6 of gate 276, and since REPEAT swich contact **436*c* connects lead 292 to positive supply lead 164, each of gates 274 and 276 have both inputs positive to drive the gate outputs to lead 282 to ground, thereby to energize supply motor 48 during the pre-set delay time. The REWIND and FAST FORWARD functions are enabled by direct grounding of supply motor 48 and take-up motor 60 through respective pushbutton switches 446 and 442.**

Also utilized more particularly in the teaching machine applications are the control tone stop functions as enabled by the control tone circuitry 200 (FIG. 5). Assuming the running or play condition of the tape transport 10, with input pins 12 and 13 to NAND gate 280 each positive and maintaining output pin 11 at ground potential, a detection of a predesignated control tone burst by control tone head **32*t* for amplification through audio amplifier 288 will drive the output of amplifier 244 (pin 3) negative with subsequent input to pin 13 of NAND gate 280. This condition drives output pin 11 of NAND gate 280 positive and reflects the positive potential to input pin 9 of NAND gate 278, pin 8 already being positive, to drive output pin 10 and control lead 296 to ground potential. Grounding of control lead 296 then stops forward tape drive as well as capstan drive through de-energization of respective take-up motor 60 and capstan drive motor 72 as their respective ground connections are removed by gate modules 268 and 270. The user's depression of RESTART pushbutton switch 312** then activates the time delay logic as previously described which sets the tape transport in play operation once again.

While some facets of the present invention are particularly adapted for use in teaching machine applications, it should be understood that the inclusion of tape motion sense circuitry in combination with automatic transducer control through control bar positioning will be quite valuable for general usage with record/reproduce reproduce transport apparatus. Further, the particular components and structure particularly described should not be construed as limiting in nature since the basic teachings of the present invention may be utilized in any of various types of tape transport apparatus, e.g. eight-track cartridge transports, reel-to-reel apparatus and other hybrid forms of recording apparatus which utilize a continuous or endless recording medium.

The foregoing discloses novel record transport apparatus and circuit structure which has the advantage of offering an increased number of protective and automatically adaptable control features. The control circuitry of the present invention enables the inclusion of numerous operational controls, compatibly, through utilization of control logic circuitry which maintains proper interactive circuit relationships. It should be understood also that only selected control features may well be applied in adaptation for some specific record/reproduce transport applications.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. In record transport apparatus wherein continuous record medium is moved past a transducing position for operative contact with a transducing head, the transport including an electric source and a drive motor energizable to move said record medium, apparatus improvements comprising:

means to sense voltage transients in said elect source energizing said drive motor and responsive thereto a varying output signal proportional to the rotational speed of said drive motor;

circuit means receiving said output signal and generating a control voltate indication when said output signal is less than a preselected threshold value; and control circuit means controlled in response to said control voltage indication to de-energize said drive motor.

2. Apparatus as set forth in claim 1 wherein said means to sense voltage transients further includes:

integrating means receiving the output signal indication and providing a time integrated voltage to said circuit means.

3. Apparatus as set forth in claim 1 which is further characterized to include:

chassis support structure integrally sustaining said transport apparatus;

control bar means having said transducer head secured thereon, said control bar means being supported across said chassis and pivotally secured thereto for pivotal movement alternatively positioning the transducer head into and out of operative contact with the record medium at said transducing position;

drive means energizable to pivot said control bar means; and selective means for connecting said electric source to said drive means.

4. Apparatus as set forth in claim 1 wherein said control circuit means comprises:

gate means having one input connected to said electric source with the output supplying energizing voltage to said drive motor which is enabled by input of said control voltage indication to cease output of energizing voltage to said drive motor.

5. Apparatus as set forth in claim 1 wherein said drive motor is the record medium forward take-up motor.

6. Apparatus as set forth in claim 1 which is further characterized to include:

a first drive motor providing record medium supply drive;

a second drive motor providing capstan drive; and a third drive motor providing forward take-up drive; said sense means being connected to said third drive motor.

7. Apparatus for recording and playback of tape records which includes transport support structure, plural drive means for supplying record supply, record take-up and capstan drive functions, and transducer means movable into operative engagement with said record, the apparatus further comprising:

an electric source selectively connectable to said take-up drive means;

first gate means connected between said electric source and said record take-up drive means controlled by a first control input to energize said record take-up drive means;

second gate means connected to said electric source and selectively energizable upon receiving a gate input to generate as output said first control input to said first gate means; and circuit means receiving transient voltage input from said take-up drive means connection to said electric source and generating said gate input to said second gate means when the transient voltage input to said circuit means includes more than a pre-set number of voltage transient variations per unit time.

8. Apparatus as set forth in claim 7 wherein said circuit means comprises:

first transistor means receiving input and conductive in response to said transient voltage input from the take-up drive means; and second transistor means controlled by conduction of said first transistor means to be maintained conductive and provide low voltage output for input to said second gate means as said gate input

9. Apparatus as set forth in claim 7 which is further characterized to include:

third gate means connected to said electric source and controlled by said first control input to energize said capstan drive means.

10. Apparatus as set forth in claim 7 which is further characterized to include:

a control tone signal of predetermined frequency periodically record on said tape record;

amplifier circuitry receiving input of said control tone signal from said transducer means to generate a control stop signal output; and stop gate means receiving as input said first control input and actuated by input of said control stop signal to reverse the stop gate means voltage output as connected in circuit with said first control input thereby to reverse said first gate means.

11. Apparatus as set forth in claim 10 which is further characterized to include:

restart switch means in series with resistance/capacitance time delay means and actuatable to momentarily ground a latch gate input; and latching gate means receiving said latch gate input and stop gate means output and energized upon actuation of said restart switch means to maintain said second gate means generating said first control input.

12. Apparatus as set forth in claim 11, wherein said first, second, stop and latching gate means are comprised of two-input NAND gates.

* * * * *